United States Patent [19]

Miyake

[11] Patent Number: 5,671,295
[45] Date of Patent: Sep. 23, 1997

[54] APPARATUS FOR CONVERTING IMAGE OUTLINE DATA INTO DOT DATA REPRESENTATIVE OF DOTS TO BE FORMED

[75] Inventor: Keiji Miyake, Gifu-ken, Japan

[73] Assignee: Brother Kogyo Kabushiki Kaisha, Nagoya, Japan

[21] Appl. No.: 544,547

[22] Filed: Oct. 18, 1995

[30] Foreign Application Priority Data

Oct. 20, 1994 [JP] Japan .................................. 6-282788

[51] Int. Cl.$^6$ .................................................. G06K 9/36
[52] U.S. Cl. .................................................. 382/242
[58] Field of Search .................. 358/451, 459, 358/296, 297, 298; 382/242

[56] References Cited

U.S. PATENT DOCUMENTS

| 5,073,956 | 12/1991 | Kawamoto et al. | 382/22 |
| 5,073,960 | 12/1991 | Nakai et al. | 382/199 |
| 5,105,472 | 4/1992 | Murayama | 382/199 |
| 5,131,058 | 7/1992 | Ting et al. | 382/266 |

FOREIGN PATENT DOCUMENTS

B2-53-41017  10/1978  Japan .
A-2-116565   5/1990   Japan .

*Primary Examiner*—Jose L. Couso
*Attorney, Agent, or Firm*—Oliff & Berridge

[57] ABSTRACT

An outline font data is converted into dot data, based on which a dot image is printed. When an image represented by the outline font data has a very narrow portion or very steep end portion, whether or not dots have been prepared at picture elements surrounding that portion is examined. Then, a dot is prepared at a position that can smoothly connect those dots. Even at this narrow portion, no dots will strangely protrude from the entire shape of the produced dot image.

15 Claims, 10 Drawing Sheets

FIG. 8

| UP/DOWN \ RIGHT/LEFT | | RIGHT | | ○ | | × | |
|---|---|---|---|---|---|---|---|
| | LEFT/RIGHT | ○ | × | ○ | × |
| ○ | ○ | NEARER TO CENTER (1) | | NEARER TO CENTER (2) | NEARER TO CENTER (6) |
| | × | | | X2 (4) | X2 (8) |
| × | ○ | NEARER TO CENTER (2) | X1 (3) | NEARER TO CENTER (2) | X1 (7) |
| | × | NEARER TO CENTER (5) | X1 (7) | X2 (8) | NEARER TO CENTER (9) |

○ : DOT
× : NO DOT

FIG. 10

| n | Y-AXIS COORDINATE OF X-AXIS PIXEL LINE | INTERSECTION WITH OUTLINE (X1) | INTERSECTION WITH OUTLINE (X2) | DOT DATA PREPARED BEFORE CORRECTION | DOT DATA PREPARED AFTER CORRECTION |
|---|---|---|---|---|---|
| N-4 | 0.5 | 2.0 (2) | 6.4 (5) | 2-5 | 2-5 |
| N-3 | 1.5 | 3.7 (4) | 6.4 (5) | 4-5 | 4-5 |
| N-2 | 2.5 | 4.9 (5) | 6.3 (5) | 5-5 | 5-5 |
| N-1 | 3.5 | 5.6 (6) | 6.3 (5) | 5 | 5 |
| N | 4.5 | 6.1 (6) | 6.3 (5) | 6 | 5 |

– – –

APPARATUS FOR CONVERTING IMAGE OUTLINE DATA INTO DOT DATA REPRESENTATIVE OF DOTS TO BE FORMED

BACKGROUND OF THE INVENTION

1. Field of the Invention

The present invention relates in general to an apparatus for converting outline data representative of an outline of an image such as a letter, a symbol, and a graphical representation, into dot data representative of dots to be formed to reproduce the image. More particularly, the present invention is concerned with improvements in such a data converting apparatus.

2. Description of the Related Art

Images, such as characters including letters and symbols represented by image data, are printed, displayed, or otherwise reproduced according to the image data suitably processed by a computer. Commonly, the image data takes the form of dot data. Dot data indicates whether or not picture elements (pixels), which are the smallest part of picture image and which determine the resolution of the reproduced image, should be formed with dots. A memory with an extremely large storage capacity will be required, if a batch of dot data representative of all the images available for reproduction is prepared and stored in the image data memory, such as a character data memory. It is therefore desirable to store a batch of outline data representative of the outlines of the images such as the characters, and convert the outline data into the corresponding dot data by a suitable data converting method, when the images are printed, displayed or otherwise reproduced, as disclosed in Japanese Patent Publication No. 53-41017.

U.S. Pat. No. 5,073,956 has proposed a data converting apparatus employed with one method for converting outline data into dot data. According to this method, outlines of characters, such as letters and symbols, are superimposed on an imaginary two-dimensional coordinated screen in which a multiplicity of picture elements are defined. The screen has a plurality of pixel lines which are parallel to an x axis and which pass through the centers of the picture elements. In order to reproduce the character image, the inner area of the character will be filled with a plurality of parallel strokes that extend parallel with the pixel lines. Dot data is produced so that dots will be formed at picture elements that make up each parallel stroke. In more concrete terms, bits of dot data, indicative of the presence of dots to be formed for reproducing each parallel stroke, are prepared at successive picture elements constituting each stroke. These bits are referred to as "dot-forming bits."

In order to produce dot data, coordinate values of points where the outlines of the characters intersect at the pixel lines are first calculated. That is, coordinate values are calculated for the two end points of each stroke. Then, two picture elements, which are located inside the outlines and which are nearest to those two end points, are determined through a predetermined arithmetic calculation. The two picture elements will be referred to as "end pixels" hereinafter. Because each stroke extends between the thus calculated two end pixels, dot-forming bits for each stroke can be set at one time for all the successive picture elements located between the two end pixels.

SUMMARY OF THE INVENTION

According to the above-described conventional apparatus, however, when the character image has a narrow portion made from a very short stroke, a dot will be possibly produced that strangely protrudes from the entire appearance of the character image and accordingly will lower the image output quality.

It is therefore, an object of the present invention to overcome the above-described drawbacks, and to provide an improved data converting apparatus which is capable of reliably converting outline data into dot data of high reproducibility, even though an image represented by the outline data has a narrow portion.

These and other objects of the present invention will be attained by providing a data converting apparatus for converting a batch of outline data representative of an outline of an image such as a letter, a symbol and a graphical representation, into a batch of dot data which is indicative of whether a dot is to be formed in each of picture elements positioned in a coordinate system in which the outline data is defined, said apparatus comprising: coordinate calculating means for calculating coordinate values of intersections between outlines of the image in the coordinate system and a plurality of parallel pixel lines (or scanning lines) superimposed on the outline in the coordinate system; coordinate storing means for storing the coordinate values calculated by the coordinate calculating means such that the coordinate values for each of the pixel lines are arranged in order of the magnitude of the values; picture element judging means for retrieving, from the coordinate storing means, a pair of coordinate values constructed from adjacent two values of the ordered values and for judging whether at least one picture element is located between the pair of coordinate values; dot data preparing means for, when at least one picture element is located between the pair of coordinate values, preparing a batch of dot data such that successive bits of the dot data corresponding to all of the at least one successive picture elements positioned between the pair of coordinate values are set at one time such that each of the successive bits indicates a dot to be formed in the corresponding picture element; and dot data correction means for, when no picture element is located between the pair of coordinate values, searching status of dot data on at least one picture element located at a portion close to the pair of coordinate values and for preparing dot data for the pair of coordinate values based on the searched status.

The dot data correction means may search status on whether or not dot data, indicative of formation of dots, has been prepared at the at least one picture element located at the portion close to the pair of coordinate values. The dot data correction means may determine dot data for the pair of coordinate values based on the searched status and a predetermined standard for smoothing connection of prepared dots.

BRIEF DESCRIPTION OF THE DRAWINGS

The above and other objects, features and advantages of the invention will become more apparent from reading the following description of the preferred embodiment taken in connection with the accompanying drawings in which:

FIGS. 3 through 7 are flow charts of processings achieved by the apparatus of FIG. 1, wherein FIG. 3 is a flow chart of a first part of the processings, FIG. 4 is a flow chart of a second part of the processings, FIG. 5 is a flow chart of a third part of the processings which is a dot position correction processing characteristic to the present invention, FIG. 6 is a flow chart of a fourth part of the processings, and FIG. 7 is a flow chart of a fifth part of the processings;

FIG. 8 shows a table defining a method of preparing dot data based on the status of surrounding picture elements;

FIG. 10 shows various data calculated during the processings of FIGS. 3 through 7 for the outline data shown in FIG. 9.

DETAILED DESCRIPTION OF THE PREFERRED EMBODIMENT

Figure 1:
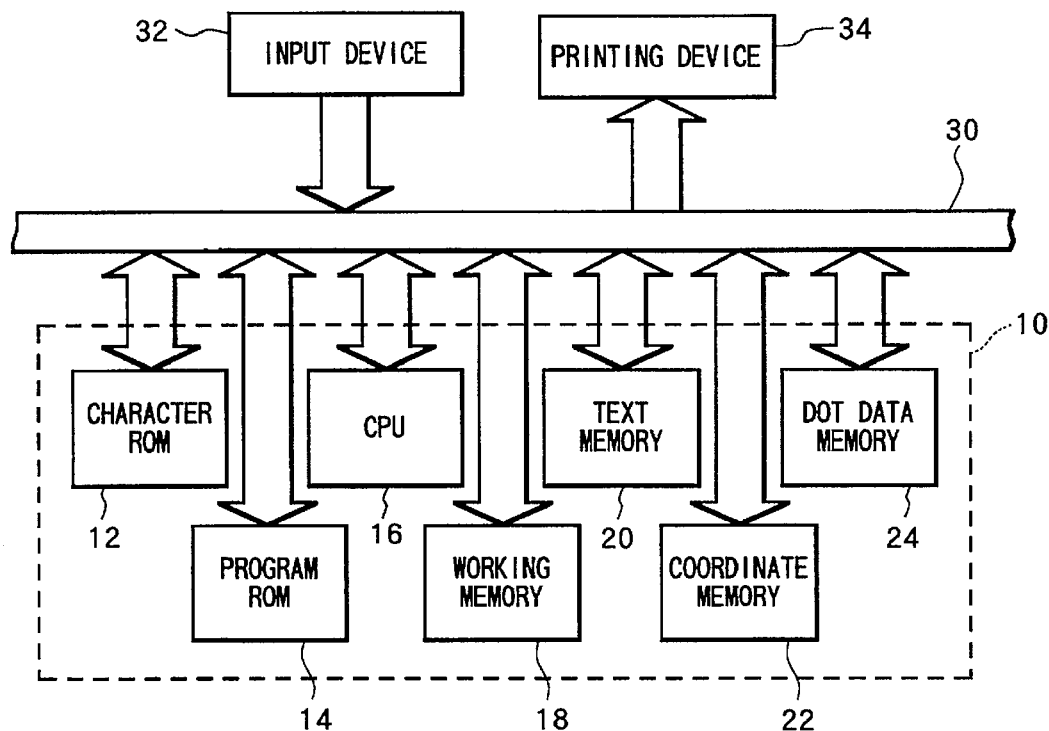
FIG. 1 is a schematic block diagram of a data converting apparatus of a preferred embodiment according to the present invention.

A data converting apparatus according to a preferred embodiment of the present invention will be described while referring to the accompanying drawings wherein like parts and components are designated by the same reference numerals as those shown in FIGS. 1 through 11 to avoid duplicating description.

The data converting apparatus constructed according to the embodiment of the present invention is for converting outline data into dot data for printing in a laser printer, in which printing on a recording medium is effected by exposing the medium surface to a laser beam controlled according to the dot data.

The schematic block diagram of FIG. 1 shows a portion of a control circuit of the laser printer, which relates to data conversion according to the principle of the invention. The control circuit is principally constituted by a microcomputer 10, which includes a CPU (central processing unit) 16, a CHARACTER ROM (read-only memory) 12, a PROGRAM ROM (read-only memory) 14, a TEXT memory 20, a WORKING memory 18, a COORDINATE memory 22, and a DOT DATA memory 24. These elements of the microcomputer 10 such as the CPU 16 are interconnected to each other through a bus 30. To the bus 30, there are connected a data input device 32 and a printing device 34. The input device 34 is provided to load the microcomputer 10 with necessary data for printing, while the printing device 34 is constructed to effect laser printing according to commands and signals supplied from the microcomputer 10.

Figure 2:
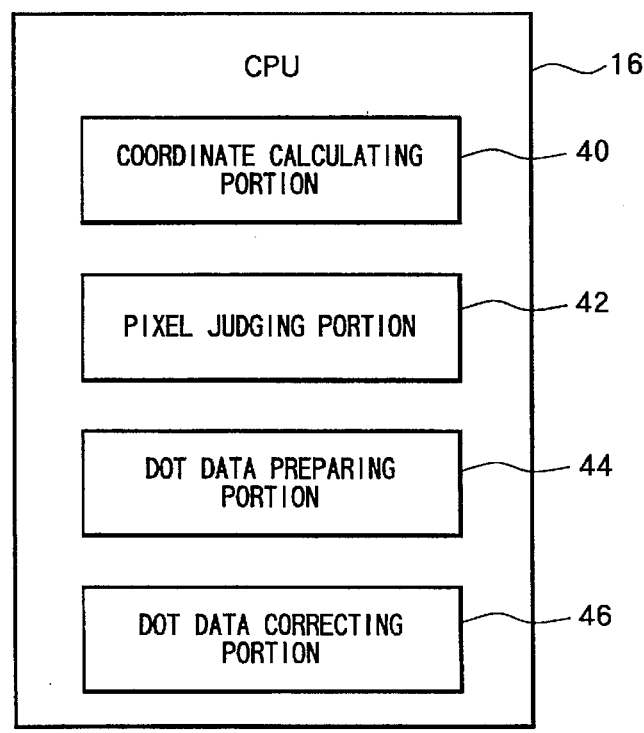
FIG. 2 is a schematic view of a central processing unit (CPU) in the apparatus of FIG. 1.

As schematically indicated in FIG. 2, the CPU 16 includes: a coordinate calculating portion 40; a pixel judging portion 42; a dot data preparing portion 44; and a dot data correcting portion 46. The coordinate calculating portion 40 is for operating to calculate coordinates of intersections between an outline of an image in the form of a character and x-axis pixel lines x of a coordinated pixel screen (which will be described later). The calculated coordinate values will be stored in the COORDINATE memory 22 such that the coordinate values for each of the pixel lines are arranged from the smallest to the largest in order of the magnitude of the values. The pixel judging portion 42 is for successively retrieving, from the COORDINATE MEMORY 22, a pair of coordinate values that are adjacent in the ordered values and for judging whether any pixels exist between the extracted pair of coordinate values. When any pixels are determined to exist between the pair of coordinate values, the dot data preparing portion 44 prepares a batch of dot data. Successive bits in the dot data indicate formation of dots at a plurality of successive picture elements located between the retrieved pair of coordinate values. When no pixels are determined to exist between the pair of coordinate values, the dot data correcting portion 46 searches status of pixels near the pair of coordinate values, and sets dot data, based on the searched status and a predetermined standard, to smoothly connect dots.

The PROGRAM ROM 14 previously stores a data conversion control program (which will be described later,) to be executed by the CPU 16, i.e., by the portions 40, 42, 44, and 46, for converting outline data into dot data. The PROGRAM ROM 14 also previously stores a table shown in FIG. 8 indicative of the predetermined standard, based on which the dot data correcting portion 46 performs the dot data correcting operation. The CHARACTER ROM 12 previously stores multiple batches of outline data representative of the outlines of multiple characters such as alphabetic and other letters and symbols, and any other images. The WORKING memory 18 is for temporarily storing data necessary for the microcomputer 10 to execute the data conversion control program. The text MEMORY 20 is for temporarily storing a batch of character data in the form of code data indicative of a text entered through the input device 32. The COORDINATE memory 22 is for temporarily storing the coordinate values calculated by the coordinate calculating portion 40. The DOT DATA memory 24 is for temporarily storing dot data prepared by the dot data preparing portion 44 and the dot data correcting portion 46. The printing device 34 is for performing a printing operation based on the dot data stored in the DOT DATA memory 24.

FIGS. 3 through 7 are flow charts indicative of a program executed by the CPU 16 to convert outline data into dot data. The table of FIG. 8 shows the predetermined standard for correcting dot data. The standard is designed to prepare dot data for reproducing a narrow portion of an image while correcting the dot data based on the status of pixels surrounding the image narrow portion, so as to provide smooth connection between dots. While the program shown in FIGS. 3 through 7 is executed, dot data is prepared while being properly corrected in accordance with this standard.

Figure 9:
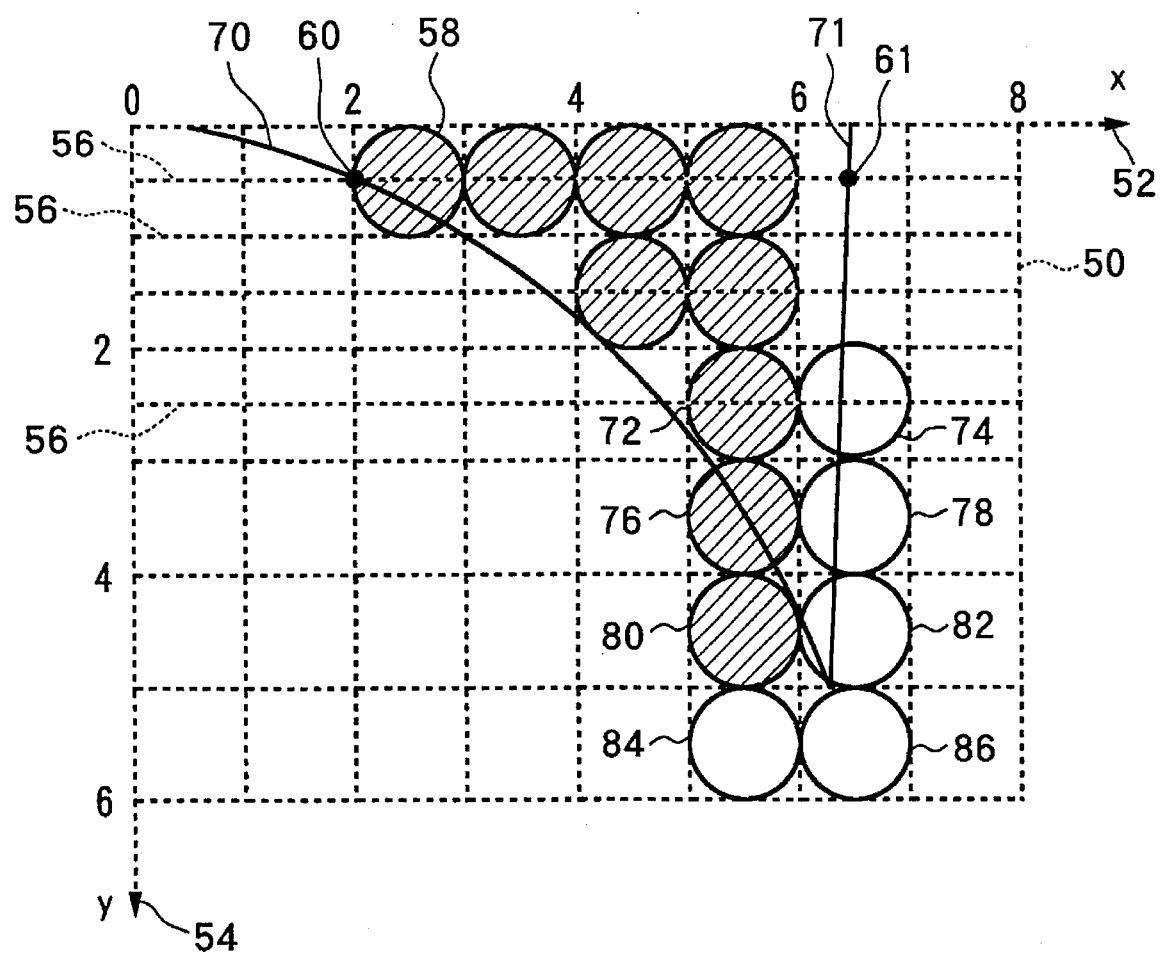
FIG. 9 shows the print result obtained by the present embodiment.

FIG. 9 illustrates how dot data is prepared from outline data according to the present embodiment. An imaginary two-dimensional coordinated pixel screen 50 is used in order to convert outline data of image, such as a character, into a corresponding batch of dot data. According to the outline data, outlines 70 and 71 of the image are superimposed on the pixel screen 50. The pixel screen 50 consists of a multiplicity of picture elements, which are the smallest parts of a picture image available on the laser printer. The picture elements are defined by equally spaced-apart x-axis partition lines parallel to the x axis 52 of the screen 50, and equally spaced-apart y-axis partition lines which are parallel to the y axis 54 of the screen and perpendicular to the x-axis partition lines. As also shown in FIG. 9, there are provided multiple x-axis pixel lines 56 which extend parallel to the x axis 52 and are positioned intermediate between the adjacent x-axis partition lines. Each x-axis pixel line 56 passes the centers of the picture elements in a corresponding row parallel to the x axis. In this example, the position of each picture element is defined not by the coordinate value of the center of the picture element. The position of each picture element is defined by the x-axis coordinate value of a y-axis partition line located at the leftside of the picture element. For example, the position of a picture element 58 is defined by the x-axis coordinate value of 2, while the center of the picture element 58 has the x-axis coordinate value of 2.5. The data conversion process of the present invention produces dot data including dot-forming bits, which indicate the presence of dots to be formed at the picture elements, and non-dot-forming bits, which indicate absence of dots to be formed. Dot-forming bits are indicated in FIG. 9 by slanted lines. The dot-forming bits are prepared at several picture elements to indicate that circular dots are to be printed at the corresponding picture elements.

FIG. 10 is a table, prepared in the COORDINATE memory 22, for listing the coordinate values of the intersections 60 and 61 between the outlines 70 and 71 and the x-axis pixel lines 56. The table also lists positions of picture elements at which dot-forming bits are prepared according to the present embodiment.

Figure 3:
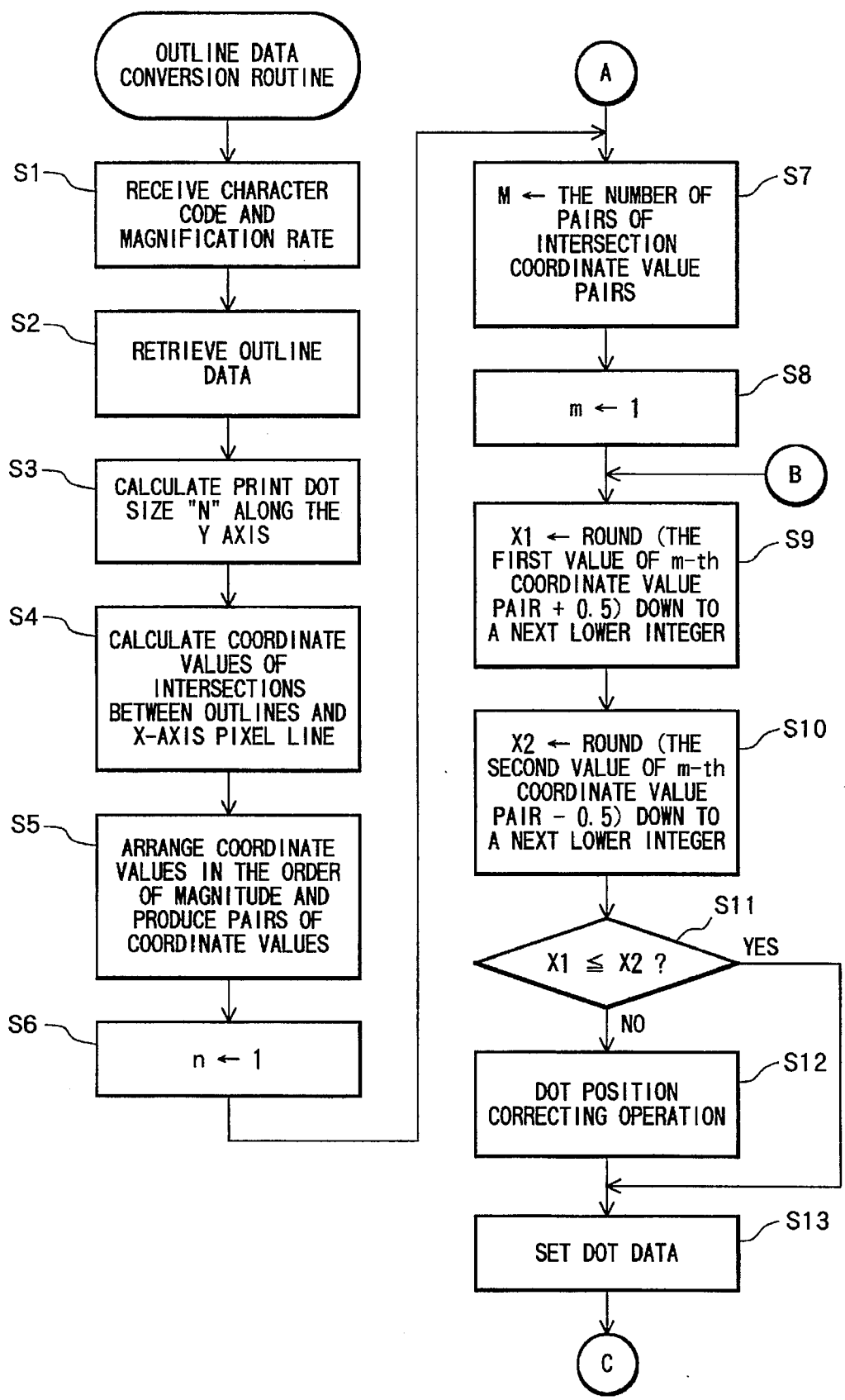

Next will be given the data conversion control program executed by the present embodiment, with reference to FIGS. 3 and 4.

In step S1, the microcomputer 10 receives from the input device 32 character code data of inputted characters, symbols, and the like. The microcomputer 10 also receives from the input device 32 data of a magnification rate, with which the inputted image is desired to be printed. The character code data and the magnification rate data is temporarily stored in the TEXT memory 20. In S2, outline data indicative of outlines of the inputted image is retrieved from the CHARACTER ROM 12 in accordance with the character code stored in the TEXT memory 20. In S3, a print dot size "N" is calculated based on the outline data and the magnification rate data. The print dot size "N" indicates the size, along the y axis 54, of the image to be printed. Next in S4, the coordinate value calculating portion 40 of the CPU 16 calculates the coordinate values of the intersections 60 and 61 between the outlines 70 and 71 and the x-axis pixel lines 56. In S5, the coordinate values calculated on each of the plurality (N, for example) of x-axis pixel lines 56 are arranged from the smallest to the largest. Thus ordered values are paired such that the two values of each pair are next to each other in terms of the magnitude of the values, and are stored in the COORDINATE memory 22. In S6, a variable "n", for controlling a program loop constructed from S7 to S17 as described below, is set to one (1).

In S7, the number "M" of pairs of intersection coordinate values at the n-th x-axis pixel line 56 is counted. In S8, another variable "m" for controlling a program loop constructed from S9 to S15 described below is set to one (1). In S9, calculations are performed to determine the coordinate value of a picture element whose center is located between the outlines 70 and 71 and nearest to the intersection 60. Similarly, in S10, calculations are performed to determine the coordinate value of a picture element whose center is located between the outlines 70 and 71 and nearest to the intersection 61. Thus, in S9, the coordinate value of a picture element, that is located between the intersections 60 and 61 and that is nearest to the intersection 60, is determined. In S10, the coordinate value of a picture element, that is located between the intersections 60 and 61 and that is nearest to the intersection 61, is determined. Thus obtained two picture elements are two end pixels that are located at opposite ends of a constituent stroke of the character image which extends along the n-th axis pixel line 56.

In more concrete terms, in S9, the value of 0.5 is added to the first coordinate value of the m-th pair. The sum is rounded down to a next lower integer. The calculated result is set to a variable "X1". In S10, the value of 0.5 is subtracted from the second coordinate value of the m-th pair. The result is rounded down to a next lower integer. The calculated result is set to a variable "X2". The two end pixels have therefore coordinate values of X1 and X2, respectively.

Next, in S11, the variable X1 is compared with the variable X2. If X1 is equal to or lower than X2 (Yes in S11), the program directly proceeds to S13 where dot-forming bits of dot data are set to all the succeeding pixels located between the end pixels indicated by X1 and X2. Thus formed dot data is stored to the DOT DATA memory 24, in S13. On the other hand, if X1 is higher than X2 (No in S11), the program proceeds to S12 where a correction operation is performed. The correction operation is characteristic to the present invention. Then, the program proceeds to S13 where dot data is set and stored in the memory 24.

Figure 4:
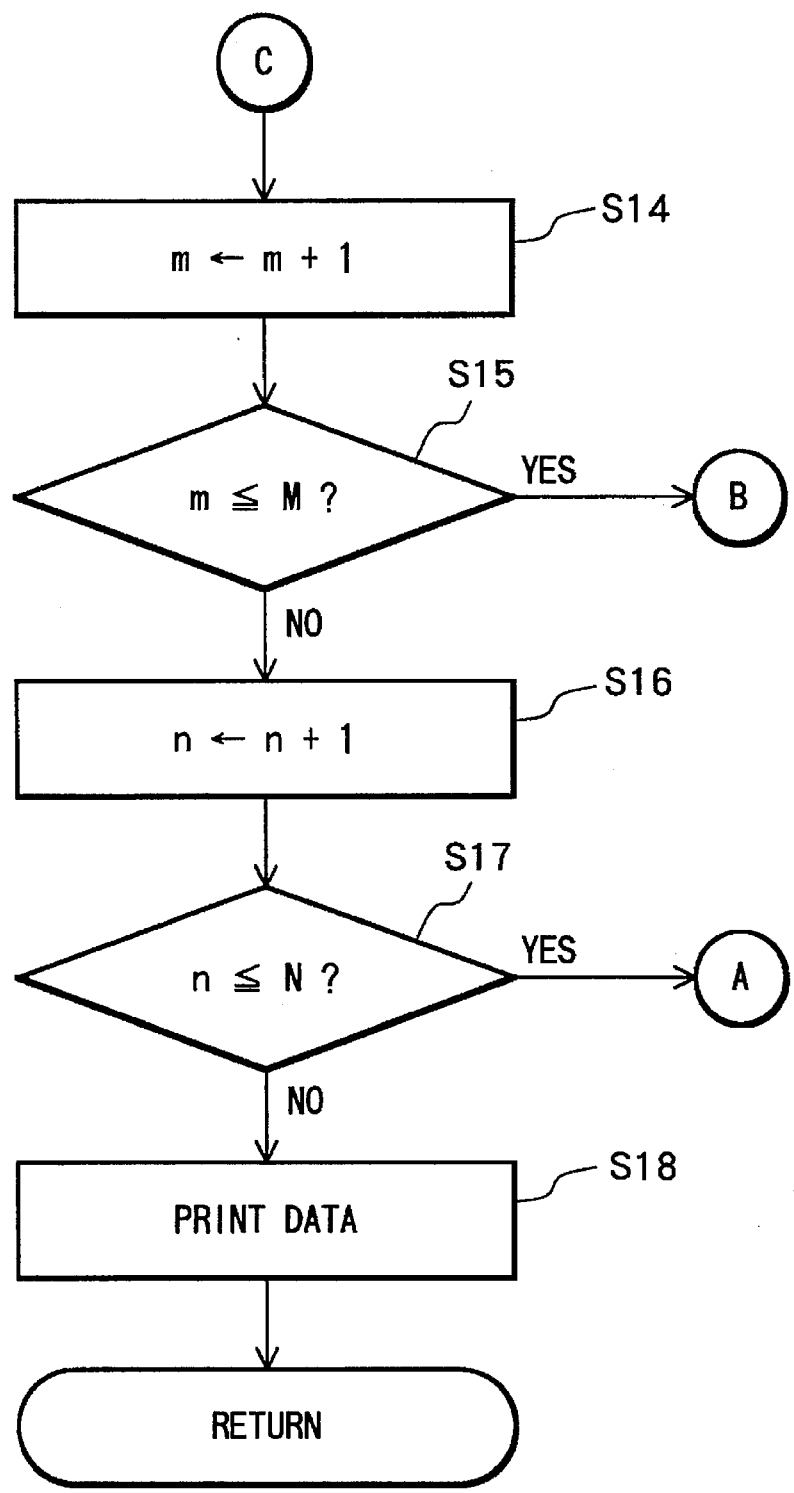

Next, as shown in FIG. 4, one (1) is added to the variable "m", in S14. The variable "m" is compared with the number "M", in S15. If "m" is equal to or lower than "M" (Yes in S15), processes of S9 and so on are repeated. On the other hand, if "m" becomes higher than "M" (No in S15), one (1) is added to the variable "n", in S16. The variable "n" is then compared with the display dot size "N", in S17. If "n" is equal to or lower than "N" (Yes in S17), the processes of S7 and so on are repeated. On the other hand, if "n" becomes higher than "N" (No in S17), the program proceeds to S18 wherein the dot data stored in the DOT DATA memory 24 are printed by the print device 34 in accordance with commands from the microcomputer 10.

The above-described processings will be described in more detail below for the example shown in FIGS. 9 and 10.

In the table of FIG. 10, the column "n" represents coordinate values of x-axis pixel lines 56 along the y axis 54. As apparent from the table, the outlines 70 and 71 intersect N number of x-axis pixel lines 56. The number N is therefore equal to the size, in print dots, of the image along the y axis. For simplicity and clarity, the table of FIG. 10 lists informations on only five x-axis pixel lines 56 at the bottom of the image. Coordinate values of the intersections 60 between the outline 70 and the (N–4)-th through N-th x-axis pixel lines 56 are 2.0, 3.7, 4.9, 5.6, and 6.1. Coordinate values of the intersections 61 between the outline 71 and the (N–4)-th through N-th pixel lines 56 are 6.4, 6.4, 6.3, 6.3, and 6.3.

The value X1, also listed in the table, is indicative of the coordinate value of a first end pixel that is located between the outlines 70 and 71 and that is nearest to the intersection 60. The first end pixel is a pixel that is located substantially to the right of and nearest to the intersection 60. The value X2, also listed in the table, is indicative of the coordinate value of a second end pixel that is located between the outlines 70 and 71 and that is nearest to the intersection 61. The second end pixel is a pixel that is located substantially to the left of and nearest to the intersection 61. These values X1 and X2 are calculated in S9 and S10 based on the coordinate values of intersections 60 and 61. For example, in the (N–4)-th x-axis pixel line 56 which has a Y-coordinate value of 0.5, the intersection coordinate values of 2.0 and 6.4 are paired. Based on the first one of the pair, i.e., 2.0, the variable X1 is set to 2 in S9. Based on the second one of the pair, i.e., 6.4, the variable X2 is set to 5 in S10. Dot-forming bits are then prepared in S13 for successive pixels that are located at the coordinate values of 2, 3, 4, and 5, and stored in the memory 24. In the (N–3)-th and (N–2)-th x-axis pixel lines, the similar processes are conducted. In the (N–3)-th line, dot-forming bits are prepared for successive pixels at the coordinate values of 4 and 5. In the (N–2)-th line, a dot-forming bit is prepared for a single pixel at the coordinate value of 5.

In the (N–1)-th line, the first one of the coordinate value pair is 5.6, and therefore the variable X1 is set to 6. Because the second one is 6.3, the variable X2 is set to 5. In the N-th line, the first one is 6.1, and therefore the variable X1 is set to 6. The second one is 6.3, and therefore the variable X2 is set to 5. Because X1 is higher than X2 for both lines (No in S11), the program proceeds to the correction operation of S12.

As in the cases of the (N−1)-th and N-th lines, when the pair of intersections 60 and 61 are very close to each other, the value X1 sometimes becomes higher than the value X2 by the amount of one (1). In other words, the two end pixels of the coordinates X1 and X2 are determined as next to each other so that the end pixel of X1 is located to the right of the end pixel of X2. Accordingly, the positional relationship between the end pixels of the coordinates X1 and X2 becomes reverse to the positional relationship between the intersections 60 and 61. That is, though the intersection 61 is located to the right of the intersection 60, the end pixel X2 obtained from the intersection 61 is located to the left of the end pixel of X1 obtained from the intersection 60. A dot-forming bit should be prepared at either one of the two end pixels of the coordinates X1 and X2.

Figure 11:
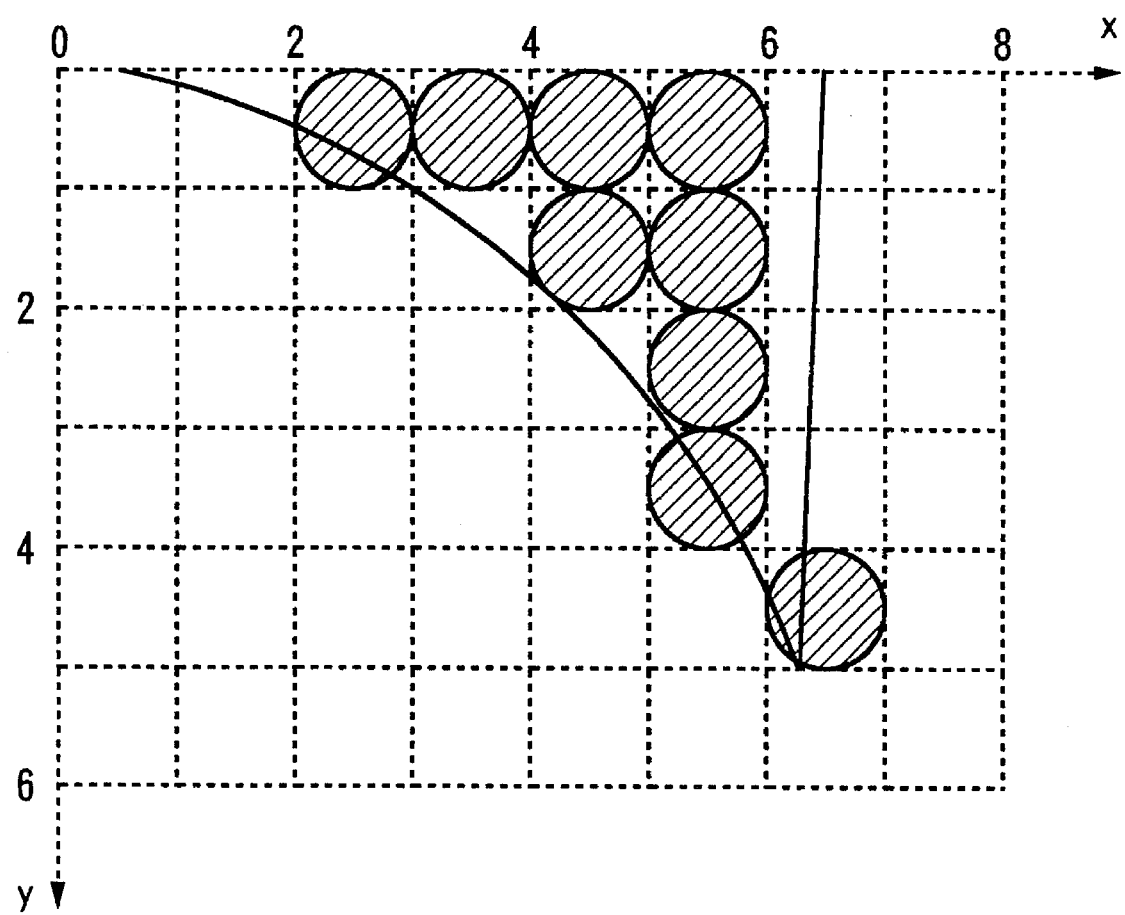
FIG. 11 shows a comparative print result.

FIG. 11 shows one comparative method, wherein a dot-forming bit is prepared at one of the two end pixels X1 and X2 whose center is nearer to the center position between the two intersections 60 and 61. In other words, a dot-forming bit is prepared at one of the two end pixels X1 and X2 that is nearer to the center position between the two intersections 60 and 61. In this example, because the coordinate value of the center between the intersections 60 and 61 is 5.95 at the (N−1)-th pixel line, a dot-forming bit is prepared at the pixel of the coordinate value X2 (5). Contrarily, because the coordinate value of the center between the intersections 60 and 61 is 6.2 at the N-th line, a dot-forming bit is prepared at the pixel of the coordinate value of X1 (6). Accordingly, as shown in FIG. 11, though dots will be produced on the lefthand side of the outline 71 on the (N−4)-th through (N−1)-th lines, one dot on the N-th line will be shifted to the right from the outline 71. This will lower the image output quality.

In order to prevent this lowering of the image output quality, a dot should be prepared at one of the two end pixels that can provide smooth connection between dots. The pixel selection should therefore be performed dependent on the circumstances of dots which have been prepared at positions surrounding those end pixels. The correction processing of S12 of the present embodiment performs such a pixel selection operation. That is, the correction operation first examines the status of dots which have been prepared on pixel lines directly above and below the n-th pixel line, on which the subject end pixels X1 and X2 are located (referred to as a subject pixel line.) The correction operation then produces dot data while correcting the dot data in accordance with the examined dot status.

The table shown in FIG. 8 determines the standard, employed in the correction operation of S12, to prepare dot data in accordance with the status of dots prepared at directly above and below the subject end pixels X1 and X2. In the table, four columns define the status of a dot on a pixel that is located directly above the subject end pixel X1 (referred to as an upper righthand pixel) and the status of a dot on a pixel that is located directly above the subject end pixel X2 (referred to as an upper lefthand pixel.) The four columns therefore define four different conditions: a first status where dots have been set for both the upper righthand pixel and the upper lefthand pixel for the subject end pixels; a second status where a dot has been set for the upper righthand pixel but not for the upper lefthand pixel; a third status where no dot has been set for the upper righthand pixel but a dot has been set for the upper lefthand pixel; and a fourth status where no dot has been set for the upper righthand pixel or the upper lefthand pixel.

Similarly, four rows define the status of dots on a pixel that is located directly below the subject end pixel X1 (referred to as a lower righthand pixel) and on a pixel that is located directly below the subject end pixel X2 (referred to as a lower lefthand pixel). The four rows therefore define four different conditions: a first status where dots have been set for both the lower righthand pixel and the lower lefthand pixel for the subject end pixels; a second status where a dot has been set for the lower lefthand pixel but not for the lower righthand pixel; a third status where no dot has been set for the lower lefthand pixel but a dot has been set for the lower righthand pixel; and a fourth status where no dot has been set for the lower righthand pixel or the lower lefthand pixel.

The table therefore determines sixteen conditions, in total, of the four pixels (the upper righthand pixel, the upper lefthand pixel, the lower righthand pixel, and the lower lefthand pixel) that surround the subject pair of end pixels X1 and X2. For each of the sixteen conditions, the table lists a pixel, to which a dot should be prepared for the subject pair of pixels X1 and X2. The table determines that a dot should be prepared for the end pixel X1; the end pixel X2; or the end pixel X1 or X2 that is nearer to the center between the intersections 60 and 61. The parenthesized numbers also listed in the table indicate the steps in the flowchart shown in FIGS. 6 and 7 where the corresponding operation is executed.

Figure 5:
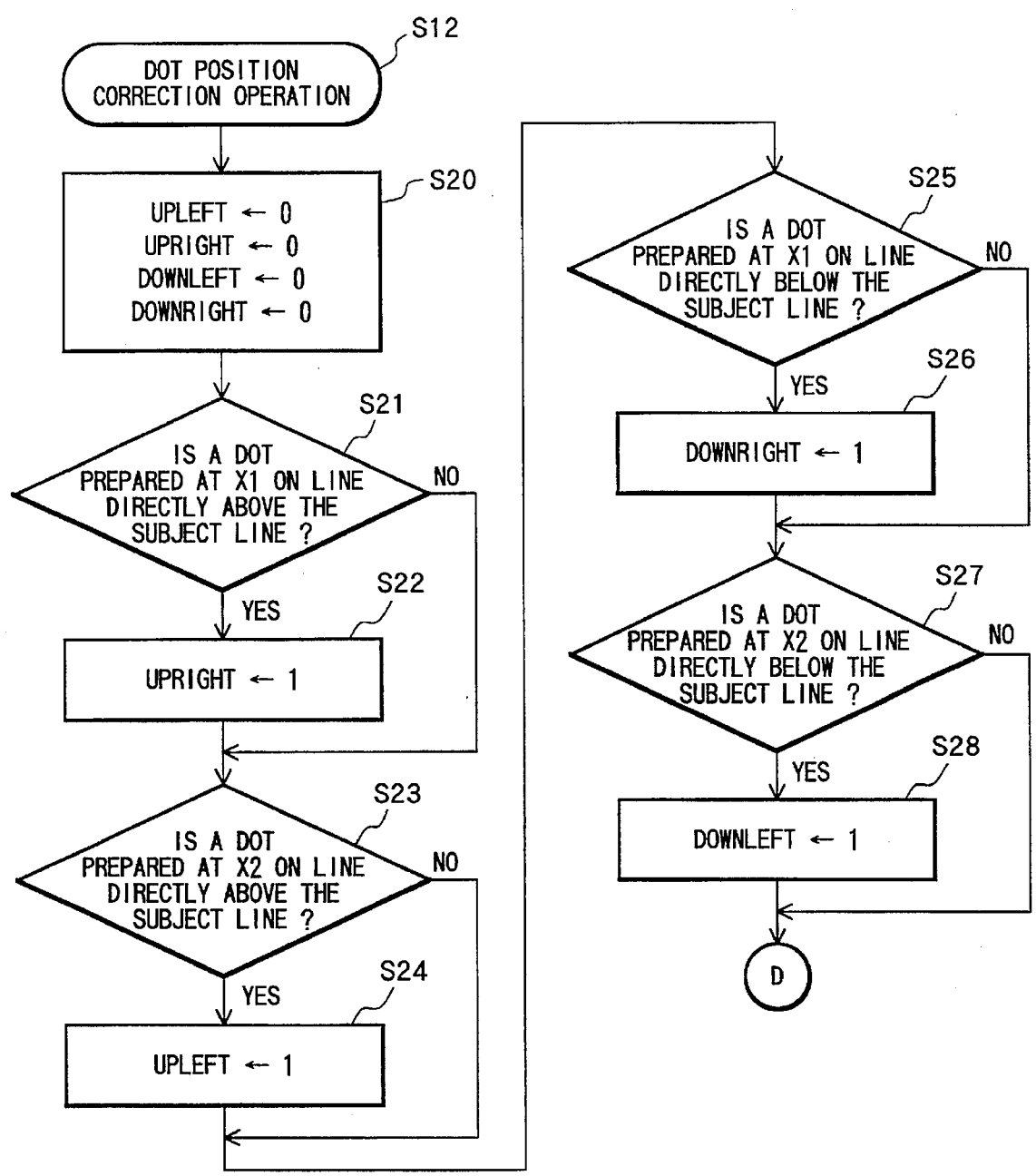
Figure 6:
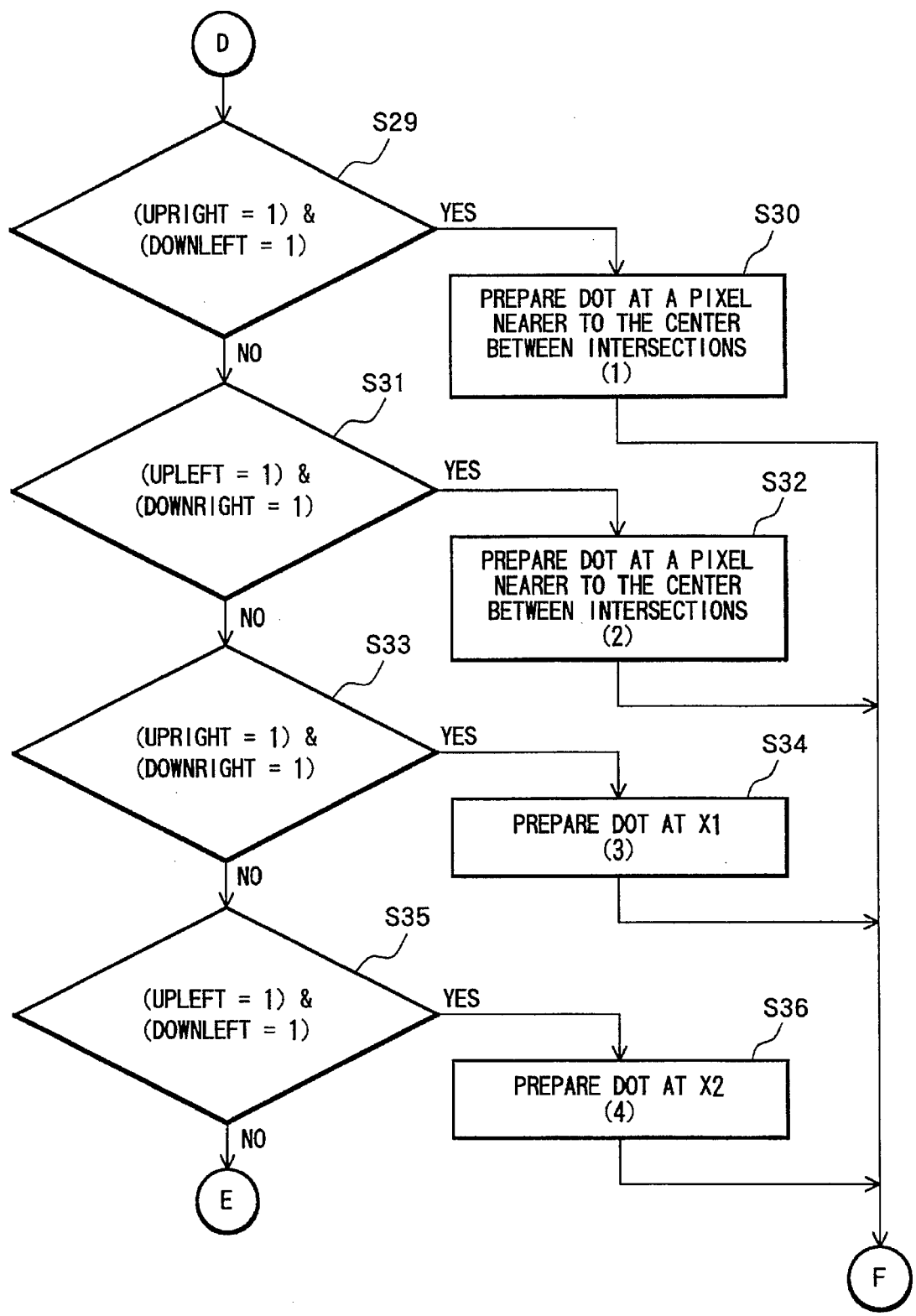
Figure 7:
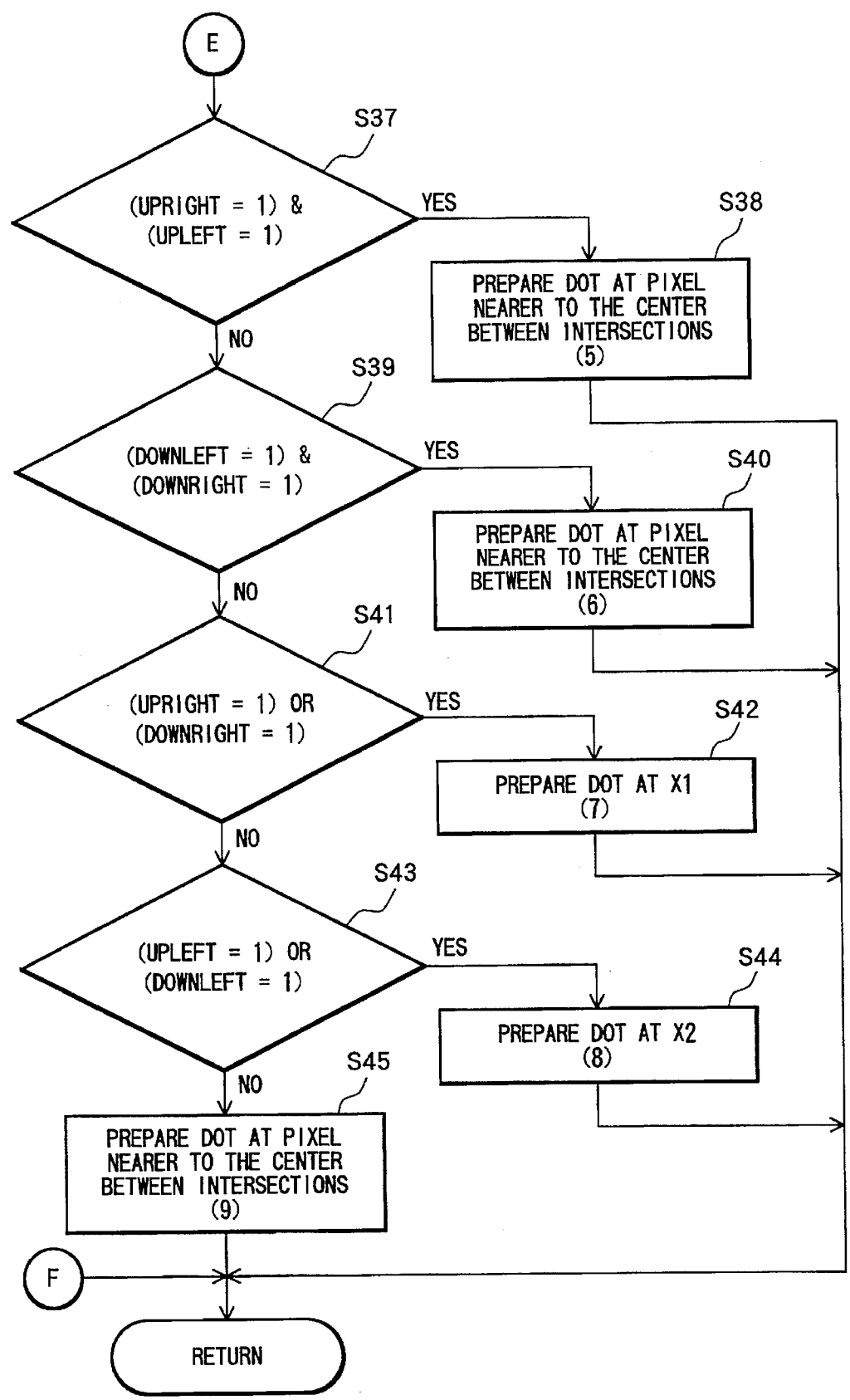

The correction operation of S12 will be described in detail below with reference to FIGS. 5 through 7.

When the correction operation of S12 starts, four variables UPLEFT, UPRIGHT, DOWNLEFT, and DOWNRIGHT are first initialized to zero (0) in S20. The variable UPLEFT will be set to one (1) when a dot-forming bit has been prepared at an upper lefthand pixel that is located on a line directly above the subject line (n-th line, in this case) and that has the coordinate value of X2. The variable UPRIGHT will be set to one (1) when a dot-forming bit has been prepared at an upper righthand pixel that is located on a line directly above the subject line and that has the coordinate value of X1. The variable DOWNLEFT will be set to one (1) when a dot-forming bit has been prepared at a lower lefthand pixel that is located on a line directly below the subject line and that has the coordinate value of X2. The variable DOWNRIGHT will be set to one (1) when a dot-forming bit has been prepared at a lower righthand pixel that is located on a line directly below the subject line and that has the coordinate value of X1.

The setting of the variable UPRIGHT is performed in S21 and S22. The setting of the variable UPLEFT is performed in S23 and S24. The setting of the variable DOWNRIGHT is performed in S25 and S26. The setting of the variable DOWNLEFT is performed in S27 and S28.

In S29 through S45, conditions of the four variables UPLEFT, UPRIGHT, DOWNLEFT, and DOWNRIGHT are judged. Based on the judged results and the table of FIG. 8, one of the variables X1 and X2, at which a dot should be prepared, is determined. In more concrete terms, in S29, when both the variables UPRIGHT and DOWNLEFT are 1, a dot-forming bit is prepared in S30 at a pixel that is one of the end pixels X1 and X2 and that is nearer to the center between the intersections 60 and 61, as indicated at (1) of FIG. 8. In S31, when both the variables UPLEFT and DOWNRIGHT are 1, a dot-forming bit is prepared in S32 also at a pixel that is one of the end pixels X1 and X2 and that is nearer to the center between the intersections, as indicated at (2) of FIG. 8. In S33, when both the variables UPRIGHT and DOWNRIGHT are 1, a dot-forming bit is prepared at the end pixel X1 in S34, as indicated at (3) of FIG. 8. In S35, when both the variables UPLEFT and DOWNLEFT are 1, a dot-forming bit is prepared at the end pixel X2 in S36, as indicated at (4) of FIG. 8.

In S37, when both the variables UPRIGHT and UPLEFT are 1, a dot-forming bit is prepared in S38 at a pixel that is one of the end pixels X1 and X2 and that is nearer to the center between the intersections, as indicated at (5) of FIG. 8. In S39, when both the variables DOWNLEFT and DOWNRIGHT are 1, a dot-forming bit is prepared in S40 at a pixel that is one of the end pixels X1 and X2 and that is nearer to the center between the intersections, as indicated at (6) of FIG. 8. In S41, when either one of the variables UPRIGHT and DOWNRIGHT is 1, a dot-forming bit is prepared at the end pixel X1 in S42, as indicated at (7) of FIG. 8. In S43, when either one of the variables UPLEFT and DOWNLEFT is 1, a dot-forming bit is prepared at the end pixel X2 in S44, as indicated at (8) of FIG. 8. If any of the above conditions are not met, S45 is conducted to prepare a dot-forming bit at a pixel that is one of the pixels X1 and X2 and that is nearer to the center between the intersections, as indicated at (9) of FIG. 8.

The above-described operation will be described with reference to the example shown in FIGS. 9 and 10.

First, the operation conducted for the (N−1)-th line is described. In FIG. 9, dot data which will be prepared at a subject end pixel of the coordinate X1 (6) is indicated by 78. Dot data which will be prepared at another subject end pixel of the coordinate X2 (5) is indicated by 76. In the (N−2)-th line directly above the (N−1)-th line, a dot-forming bit 72 has been prepared at a pixel of the coordinate X2 (5). That is, a dot-forming bit 72 has been prepared at an upper lefthand pixel for the subject end pixels. Dot data 74, prepared at a pixel of the coordinate X1 (6) is not a dot-forming bit. Dot data 74 is a non-dot-forming bit indicative of absence of dot to be formed at the corresponding pixel. Thus, no dot-forming bit has been prepared at an upper righthand pixel for the subject end pixels. In the N-th line directly below the (N−1)-th line, dot data has not yet been prepared for either of a lower lefthand pixel, that has the coordinate X2, and a lower righthand pixel, that has the coordinate X1. Accordingly, the four variables are in the following conditions:

UPLEFT=1,
UPRIGHT=0,
DOWNLEFT=0, and
DOWNRIGHT=0

The determination in S43 is therefore affirmative (yes), and a dot-forming bit is prepared at the pixel of the coordinate X2. In other words, a dot-forming bit 76 is prepared.

Next, the operation conducted for the N-th line will be described. In FIG. 9, dot data which will be prepared at a subject end pixel of the coordinate X1 (6) is indicated by 82. Dot data which will be prepared at another subject end pixel of the coordinate X2 (5) is indicated by 80. In the (N−1)-th line directly above the N-th line, a dot-forming bit 76 has been prepared at a pixel of the coordinate X2 (5). In other words, a dot-forming bit 76 has been prepared at an upper lefthand pixel for the subject end pixels. Dot data 78, prepared at a pixel of the coordinate X1 (6), is not a dot-forming bit but is a non-dot-forming bit. Thus, no dot-forming bit has been prepared at an upper righthand pixel for the subject end pixels. In the (N+1)-th line directly below the N-th line, dot data has not been prepared for either of a lower lefthand pixel, that has the coordinate X2, and a lower righthand pixel, that has the coordinate X1. Accordingly, the four variables are in the following conditions:

UPLEFT=1,
UPRIGHT=0,
DOWNLEFT=0, and
DOWNRIGHT=0

The determination in S43 is therefore also affirmative (yes), and a dot-forming bit is prepared at the pixel of the coordinate X2. In other words, a dot-forming bit 80 is prepared.

As described above, according to the present embodiment, an outline font data is converted into dot data, based on which a dot image is printed. When an image represented by the outline font data has a very narrow portion or very steep end portion, whether or not dots are prepared at picture elements surrounding that portion is examined. Then, a dot is prepared at a position that can smoothly connect those dots. For example, in the case of FIG. 9, a dot-forming bit 76 is prepared on the (N−1)-th line and a dot-forming bit 80 is prepared on the N-th line. Accordingly, even at this narrow portion, no dots will strangely protrude from the entire shape of the produced dot image, contrary to the comparative result of FIG. 11.

It is noted that the contents of the table of FIG. 8 can be modified according to kinds or types of characters, the output size, and the output resolution. It is therefore possible to more finely control the dot data preparing operation.

While the invention has been described in detail with reference to the specific embodiment thereof, it would be apparent to those skilled in the art that various changes and modifications may be made therein without departing from the spirit of the invention.

In S5, the intersection coordinate values are arranged from the smallest to the largest. However, the intersection coordinate values can be arranged from the largest to the smallest.

In S9 and S10, values X1 and X2 are calculated through rounding the intersection coordinate values down to next lower integers. Values X1 and X2 can be calculated through rounding the intersection coordinate values up to next higher integers.

For setting of a dot-forming bit, one is selected from the two end pixels X1 and X2 based on information on whether dot-forming bits have been prepared at each of four pixels that are positioned directly above and below the two end pixels X1 and X2. However, the selection can be attained based on the status of dot data at pixels that are diagonally above and below the pixels X1 and X2. The selection can be attained based on the status of dot data at pixels that are indirectly above and below the pixels X1 and X2 and that are separated from the pixels by one or more pixel widths.

In the above-described embodiment, the contents of the table of FIG. 8 is fixed. However, the contents of the table can be changed according to the kinds and types of inputted characters, output size, output resolution, and the like so that the dot data preparing operation can be more finely controlled.

In the embodiment, a dot-forming bit is set at either one of the two pixels X1 and X2. Non-dot-forming bits can be set to both the two pixels X1 and X2 if such setting will improve the image output quality. Similarly, dot-forming bits can be set to both the two pixels if such setting will improve the image output quality.

As described above, the device of the present invention can convert outline data representative of outlines of characters, such as letters and symbols, into dot data for respective pixels. When the outline data represents a character having a very narrow portion or of a very small size, the conversion is attained based on the circumstances of presence of dots in the lines above and below the subject line. It is possible to obtain dot data which represents a dot that can smoothly connect the upper and lower dots to produce a nicely appearing dot image. The correction operation is simple and therefore can be easily performed.

What is claimed is:

1. A data converting apparatus for converting a batch of outline data representative of an outline of an image such as a letter, a symbol and a graphical representation, into a batch of dot data which is indicative of whether a dot is to be formed in each of picture elements positioned in a coordinate system in which the outline data is defined, said apparatus comprising:

coordinate calculating means for calculating coordinate values of intersections between outlines of an image in the coordinate system and a plurality of parallel pixel lines superimposed on the outlines in the coordinate system;

coordinate storing means for storing the coordinate values calculated by the coordinate calculating means such that the coordinate values for each of the pixel lines are arranged in order of the magnitude of the values;

picture element judging means for retrieving, from the coordinate storing means, a pair of coordinate values constructed from adjacent two values of the ordered values and for judging whether at least one picture element is located between the pair of coordinate values;

dot data preparing means for, when at least one picture element is located between the pair of coordinate values, preparing a batch of dot data such that successive bits of the dot data corresponding to all of the at least one successive picture elements positioned between the pair of coordinate values are set at one time such that each of the successive bits indicates a dot to be formed in the corresponding picture element; and dot data correction means for, when no picture element is located between the pair of coordinate values, searching status of dot data on at least one picture element located at a portion close to the pair of coordinate values and for preparing dot data for the pair of coordinate values based on the searched status.

2. A data converting apparatus as claimed in claim 1, wherein the dot data correction means searches status on whether or not dot data, indicative of formation of dots, has been prepared at the at least one picture element located at the portion close to the pair of coordinate values, the dot data correction means determining dot data for the pair of coordinate values based on the searched status and a predetermined standard for smoothing connection of prepared dots.

3. A data converting apparatus as claimed in claim 2, wherein the dot data correction means searches status of dot data prepared on at least one picture element located on a pixel line other than a pixel line, on which the pair of coordinate values are located.

4. A data converting apparatus as claimed in claim 3, wherein the dot data correction means searches status of dot data prepared on at least one picture element located on pixel lines above and below the pixel line, on which the pair of coordinate values are located.

5. A data converting apparatus as claimed in claim 4, wherein the dot data correction means searches status of dot data prepared on at least one picture element located on pixel lines directly above and below the pixel line, on which the pair of coordinate values are located.

6. A data converting apparatus as claimed in claim 2, wherein the dot data correction means searches status of dot data prepared on at least one picture element that is located surrounding the pair of coordinate values.

7. A data converting apparatus as claimed in claim 6, wherein the dot data correction means searches status of dot data prepared on two or more picture elements that are located near to and surrounding the pair of coordinate values.

8. A data converting apparatus as claimed in claim 2, wherein the coordinate storing means arranges the coordinate values for each pixel line from the smallest to the largest in the order of the magnitude of the values.

9. A data converting apparatus as claimed in claim 8, wherein the picture element judging means includes:

first end pixel calculating means for calculating a first end pixel which is located substantially to the right of and nearest to the intersection represented by a first one of the retrieved pair of coordinate values;

second end pixel calculating means for calculating a second end pixel which is located substantially to the left of and nearest to the intersection represented by a second one of the retrieved pair of coordinate values;

comparing means for comparing whether or not the first end pixel is located substantially to the left of the second end pixel, the dot data preparing means being operated to prepare the batch of dot data when the first end pixel is located substantially to the left of the second pixel end, the dot data correction means being operated when the first pixel end is to the right of the second pixel end.

10. A data converting apparatus as claimed in claim 9, wherein the dot data correction means determines, based on the searched status and the predetermined standard, one of the first and second end pixels, to which dot data indicative of formation of dots is to be prepared.

11. A data converting apparatus as claimed in claim 10, wherein the dot data correction means selectively determines, based on the searched status and the predetermined standard, both of the first and second end pixels, to which dot data, indicative of formation of dots, is to be prepared.

12. A data converting apparatus as claimed in claim 10, wherein the dot data correction means selectively determines, based on the searched status and the predetermined standard, none of the first and second end pixels, to which dot data, indicative of formation of dots, is to be prepared.

13. A data converting apparatus as claimed in claim 10, wherein the standard is determined for selecting one of the first and second end pixels, to which dot data is to be prepared, the determination being dependent on whether or not dot data have been prepared at picture elements which are located on directly above and below the first and second end pixels.

14. A data converting apparatus as claimed in claim 2, wherein the standard is determined dependently on at least one of a type of the image, an output size, and resolution.

15. A data converting apparatus as claimed in claim 2, wherein the predetermined standard is dependent on whether or not dot data, indicative of formation of dots, has been prepared at picture elements which are located on pixel lines directly above and below the pixel line, on which the pair of coordinate values are located, and which are located to surround the pair of coordinate values.

* * * * *